(12) United States Patent
Kulkarni et al.

(10) Patent No.: US 11,457,346 B2
(45) Date of Patent: Sep. 27, 2022

(54) ELECTRONIC DEVICE AND METHOD FOR MANAGING AN IC CARD WITH MULTIPLE SIM PROFILES

(71) Applicant: NXP B.V., Eindhoven (NL)

(72) Inventors: Giten Kulkarni, Bangalore (IN);
Christian Paul, Tornesch (DE);
Shameer Puthalan, Bangalore (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/811,557

(22) Filed: Mar. 6, 2020

(65) Prior Publication Data

US 2020/0296573 A1 Sep. 17, 2020

(30) Foreign Application Priority Data

Mar. 15, 2019 (EP) .................................... 19163161

(51) Int. Cl.
*H04B 1/38* (2015.01)
*H04W 8/18* (2009.01)
(Continued)

(52) U.S. Cl.
CPC .......... *H04W 8/183* (2013.01); *H04B 1/3816* (2013.01); *H04W 8/205* (2013.01); *H04W 12/35* (2021.01)

(58) Field of Classification Search
None
See application file for complete search history.

(56) References Cited

U.S. PATENT DOCUMENTS 9,439,062 B2 9/2016 Li et al.
9,451,098 B2 9/2016 Zhu et al.
(Continued)

FOREIGN PATENT DOCUMENTS

WO 2016/169733 A1 10/2016
WO 2016/201398 A1 12/2016

OTHER PUBLICATIONS

GSM Association Official Document SGP .22—RSP Technical Specification; Version 2.2; Sep. 1, 2017.
(Continued)

*Primary Examiner* — Jinsong Hu
*Assistant Examiner* — Alexander J Yi

(57) ABSTRACT

An electronic device and a method for managing an IC card with multiple SIM profiles is described. The electronic device comprises: i) an integrated circuit (IC) card domain, configured to store a first SIM profile and a second SIM profile, and ii) a communication domain coupled to the IC card domain via a physical interface. The IC card domain is configured to: a) generate a first logical interface on the physical interface and associate the first SIM profile with the first logical interface by providing a first logical interface identifier, and b) generate a second logical interface on the physical interface and associate the second SIM profile with the second logical interface by providing a second logical interface identifier. The communication domain is configured to: a) address the first SIM profile using the first logical interface identifier in parallel and independent of the second SIM profile and b) address the second SIM profile using the second logical interface identifier in parallel and independent of the first SIM profile.

17 Claims, 5 Drawing Sheets

(51) Int. Cl.
*H04B 1/3816* (2015.01)
*H04W 8/20* (2009.01)
*H04W 12/30* (2021.01)

(56) References Cited

U.S. PATENT DOCUMENTS

| | | | |
|---|---|---|---|
| 9,820,139 | B1 | 11/2017 | Veneroso |
| 2005/0259673 | A1* | 11/2005 | Lu .......................... H04W 92/08 370/419 |
| 2007/0280262 | A1* | 12/2007 | Larsen .................. H04L 1/1657 370/395.21 |
| 2010/0067899 | A1* | 3/2010 | Li ....................... H04J 14/0284 398/1 |
| 2014/0013406 | A1* | 1/2014 | Tremlet .................. G06F 21/32 726/5 |
| 2014/0220952 | A1 | 8/2014 | Holtmanns et al. |
| 2017/0005942 | A1* | 1/2017 | Agarwal ................. H04L 45/04 |
| 2017/0048645 | A1 | 2/2017 | Yerrabommanahalli et al. |
| 2017/0164184 | A1* | 6/2017 | Borse .................... H04B 1/3816 |
| 2017/0230820 | A1* | 8/2017 | Ho ..................... H04L 63/0853 |
| 2019/0007082 | A1 | 1/2019 | Dumoulin et al. |
| 2019/0053040 | A1* | 2/2019 | Long .................... H04W 12/06 |

OTHER PUBLICATIONS

AFNOR International Standard ISO/IEC 7816-3, Third Edition Nov. 1, 2006; Identification cards—Integrated circuit cards; Part 3: Cards with contacts—Electrical interface and transmission protocols; Nov. 2006.

* cited by examiner

ELECTRONIC DEVICE AND METHOD FOR MANAGING AN IC CARD WITH MULTIPLE SIM PROFILES

CROSS-REFERENCE TO RELATED APPLICATIONS

This application claims priority under 35 U.S.C. § 119 to European Patent Application No. 19163161.3, filed on Mar. 15, 2019, the contents of which are incorporated by reference herein.

FIELD OF THE INVENTION

The invention relates to an electronic device with an integrated circuit (IC) card domain that has two or more SIM profiles and a communication domain, wherein the IC card domain and the communication domain are connected via a physical connection. Furthermore, the invention relates to a method of managing the electronic device. The invention further relates to a mobile phone comprising the electronic device and a computer program product that performs the method of managing.

BACKGROUND OF THE INVENTION

Electronic devices, which may for example be comprised in mobile phones, can comprise a card domain, wherein a SIM (subscriber identity module) card, such as an UICC (universal integrated circuit card), is installed. While in former times only one SIM profile could be stored on a SIM card, nowadays two or more SIM profiles may be stored on one SIM card. This may in particular be relevant in the case of embedded SIM cards, which are generally not removable. The SIM cards are generally connected to a modem by a physical connection (within the mobile phone), and in this manner, the SIM profiles can be addressed by the modem or through the modem from a mobile network of a mobile network operator (MNO), respectively, and/or applications running on one or more application processors of the mobile phone. In present specifications, governing SIM interfacing with a modem, it is only possible to have exactly one active or enabled SIM profile on the physical interface. For dual or multiple SIM profiles, there have to be separate physical interfaces from the modem to the respective SIMs. The need for multiple physical interfaces also arises from the fact that the legacy physical SIMs are owned, provisioned and physically issued by the MNO or its representative.

FIG. 3 shows an example from the prior art. The integrated circuit (IC) card domain 330 comprises an eUICC (embedded universal integrated circuit card) and an eUICC operating system (OS) 332. There are a first SIM profile 331a and a second SIM profile 331b installed on the eUICC. However, as there is only one physical interface 390 between a modem (not shown) and the SIM profiles 331a,b, there can only be one profile active at a time. In the example shown, the second SIM profile 331b is active (enabled) and can be addressed by a modem/operator, while the first SIM profile 331a is disabled. Hence, the first SIM profile 331a can only be activated then, when the second SIM profile 331b has been disabled.

As a consequence, even though that specific SIM architectures allow for a dynamic provisioning of a SIM profile and multiple profiles from different MNOs to be installed at the same time, this architectures are still limited to having only one active SIM profile, given the limitation of having a single physical interface to the modem. As a consequence, dual or multiple SIM feature are not possible with present SIM architectures.

OBJECT AND SUMMARY OF THE INVENTION

There may be a need to provide an electronic device and a method of managing an IC card with two or more active SIM profiles in an efficient and flexible manner.

In order to achieve the object defined above, a method and a communication system according to the independent claims are provided.

According to an exemplary embodiment, an electronic device is described. The electronic device comprises: i) an integrated circuit (IC) card domain (which comprises an IC card such as a SIM card or an (e)UICC), configured to store a first (active) SIM profile and a second (active) SIM profile, and ii) a communication domain coupled to the IC card domain via a (single) physical interface.

The IC card domain is configured to: a) generate (create) a first logical interface on the physical interface (in particular generate and associate an independent context (more in particular and independent resources) to the first logical interface) and associate the first SIM profile with the first logical interface by providing a first logical interface identifier (e.g. to the communication domain) (in particular a logical identifier that is a direct or indirect reference), and b) generate a second logical interface on the physical interface (in particular generate and associate an independent context (and more in particular independent resources) to the second logical interface) and associate the second SIM profile with the second logical interface by providing a second logical interface identifier (in particular a logical identifier that is a direct or indirect reference).

The communication domain is configured to: a) address (manage/operate) the first SIM profile (via the first logical interface) using the first logical interface identifier in parallel (i.e. at the same time) and independent from the second SIM profile and/or b) address the second SIM profile (via the second logical interface) using the second logical interface identifier in parallel and independent from the first SIM profile.

According to a further exemplary embodiment, a method of managing an electronic device is described, wherein the electronic device comprises an integrated circuit (IC) card domain with a first SIM profile and a second SIM profile, and a communication domain, wherein the IC card domain and the communication domain are coupled via a physical interface. The method comprises: i) generating a first logical interface on the physical interface (and associating a (independent) context to the first logical interface), ii) associating the first SIM profile with the first logical interface by providing a first logical interface identifier, iii) generating a second logical interface on the physical interface (and associating an independent context to the second logical interface), iv) associating the second SIM profile with the second logical interface by providing a second logical interface identifier (steps i) to iv) may be performed by the IC card domain); v) addressing the first SIM profile, using the first logical interface identifier (by the communication domain) in parallel and independent from the second SIM profile; and vi) addressing the second SIM profile, using the second logical interface identifier (by the communication domain) in parallel and independent from the first SIM profile.

According to a further exemplary embodiment, a mobile device, in particular a mobile phone, is described that comprises the electronic device described above.

According to a further exemplary embodiment, a computer program product (in particular a non-transitory computer program product) is provided, which is configured to (for example, by comprising specific instructions), when being executed on a processor (or a computer), cause the processor (or computer) to perform the method as described above.

In the context of the present application, the term "electronic device" may refer to any device that comprises an electronic component. An electronic device is for example a circuit, an integrated circuit (for example the SN100U from NXP), a processor, or a computing device that comprises a processor/integrated circuit. Furthermore, an electronic device can comprise two or more processors/integrated circuits. For example, an electronic device may comprise an IC card domain and a communication domain such as a modem.

In the context of the present application, the term "IC card domain" may refer to a domain of an electronic device that comprises at least one IC card. The term "IC card" may refer e.g. to a chip, a smart card, a subscriber identity module (SIM), an embedded SIM (e.g. soldered onto a circuit board), an UICC, or an embedded UICC. The IC card may hereby be removable or embedded. Furthermore, the IC card may be enabled to store at least two SIM profiles, e.g. a dual SIM or a multiple SIM.

In the context of the present application, the term "SIM profile" may refer to specific data of a user of an electronic device that can be stored on an IC card. A SIM profile can be associated with a mobile network operator (MNO). For example, the electronic device may be part of a smart phone, and the data comprises information such as: credentials, passwords, personal data, payment data, telephone number, contract with the MNO. If more than one SIM profile are installed on an IC card, a first SIM profile may be associated with a first MNO, while a second SIM may be associated with a second MNO, wherein the first MNO may be different from the second MNO. In this manner, different operations with different operators may be performed at the same time and independent from each other. A SIM profile may also be an eSIM profile.

In the context of the present application, the term "logical interface" may refer to a software entity that is associated with a specific physical interface and/or device. Logical interfaces may be created by performing a configuration. A logical interface may be a virtual interface within a physical interface. Furthermore, a plurality of logical interfaces may be generated within one physical interface. The logical interface generation may be done by a pre-defined set of logical interfaces in an IC card OS (SIM OS). Furthermore, logical interfaces may be dynamically generated when a new SIM profile is installed and/or activated of an IC card domain. The association of a logical interface may be done at the time of installation of a SIM profile or at the first activation of the SIM profile on the IC card domain.

In the context of the present application, the term "logical interface identifier" may refer to any data that can be used to identify a specific logical interface. Furthermore, the term "logical interface identifier" may refer to any data that can be used to associate a SIM profile with a logical interface. In an example, a logical interface identifier may be realized by a node address (byte) of a contact interface protocol, e.g. the ISO 7816-3 contact protocol.

In the context of the present application, the term "addressing a SIM profile" may refer to any action that a communication device may perform with respect to a (active) SIM profile. For example, the communication device (or an application on an application processor and/or an MNO through the communication device) may install the SIM profile, change the SIM profile, activate/deactivate the SIM profile, or manage the SIM profile. In other words, the communication device may operate on the SIM profile.

According to an exemplary embodiment, an electronic device (and a method) of managing an IC card with two or more active SIM profiles in an efficient and flexible manner can be provided, when an IC card domain (which is connected to a communication device via a physical interface) of the electronic device is configured to i) generate a first logical interface on the physical interface, and associate the first SIM profile with the first logical interface by providing a first logical interface identifier, and ii) generate a second logical interface on the physical interface and associate the second SIM profile with the second logical interface by providing a second logical interface identifier. Hereby, the communication domain coupled to the IC card domain via a (single) physical interface, can be configured to: iii) address the first SIM profile using the first logical interface identifier in parallel and independent from the second SIM profile and iv) address the second SIM profile using the second logical interface identifier in parallel and independent from the first SIM profile. In this manner, the first SIM profile and the second SIM profile can be managed such that they can be addressed at the same time and independent from each other. This may be enabled by the generation of the two or more logical interfaces between the IC card domain and the communication domain, wherein each logical interface is associated to the respective SIM profile by the respective logical interface identifier. As a consequence, managing independent SIM profiles at the same time is enabled in an efficient and flexible manner. Furthermore, the described electronic device and the described method can be implemented into established systems in a feasible manner.

In the following, further exemplary embodiments of the electronic device and the method will be explained.

According to an exemplary embodiment, the IC card domain comprises an UICC, in particular an eUICC, wherein two or more SIM profiles are stored on the UICC such that the IC card domain generates (and associates) two or more respective logical interfaces (associated with the respective SIM profiles). This may provide the advantage that the described method/electronic device can be implemented directly into state of the art technology. For example, there may be applied: i) an eUICC dual SIM, ii) an eUICC multi SIM, iii) an embedded UICC dual SIM, or an iv) embedded UICC multi SIM.

According to a further exemplary embodiment, the communication device comprises a modem, in particular a baseband modem (baseband processor). This may also provide the advantage that the described method/electronic device can be implemented directly into state of the art technology.

According to a further exemplary embodiment, there is one single physical interface between the IC card domain and the communication domain. This specifies that there is exactly one physical interface between IC card domain and communication domain. Hence, there is not more than one physical interface necessary in order to address (manage) two or more active SIM profiles. In this manner, production and maintenance costs can be saved, while more space can be provided.

According to a further embodiment, the physical interface is a contact interface connection. In particular, the physical connection is one of the group consisting of an ISO 7816 connection, a Universal Asynchronous Receiver Transmitter (UART), a serial peripheral interface (SPI), an inter-integrated circuit (I2C), or an I3C. This may provide the advantage that the interface is very secure against attacks and that established and secure technologies can be directly applied.

According to a further embodiment, the first logical interface identifier and/or the second logical interface identifier is configured as a direct or indirect reference. In particular, configured as a node address. More in particular, the first logical interface identifier and/or the second logical interface identifier is configured as a node address, more in particular a node address in the ISO 7816-3 protocol. This may provide that advantage that the logical interface identifier can be provided in a robust and secure manner without additional efforts.

In an embodiment, a logical interface identifier may be implemented over the ISO 7816-3 T=1 protocol. To address the above requirement and issue, it is proposed to define multiple logical interfaces over the one physical interface between the communication domain and the IC card domain. Typically ISO 7816 UART may be used as a physical interface, but other peripheral interface like SPI or I2C or I3C may also be applied. The ISO7816-3 T=1 protocol, as a specific example, includes a "node address" which can be used to pair a source and destination entity across the physical interface. This circumstance can be used to define one logical interface per SIM profile (see also ISO/IEC 7816-3 section 11.3.1, which is incorporated in this document by reference). According to said standard, "a node address byte (NAD) allows identifying the source and the intended destination of the block; it may be used to distinguish between multiple logical connections when they coexist". However, for other physical interfaces, other schemes can be applied in the same manner.

According to a further embodiment, the first logical interface identifier comprises a pair of identifiers, each for one direction of communication and/or the second logical interface identifier comprises a pair of identifiers, each for one direction of communication. This may provide the advantage that the respective communication direction can be identified and realized in an efficient and robust manner.

According to a further embodiment, the electronic device comprises a secure element domain with a secure element, and wherein the IC card domain is integrated in the secure element domain. This may provide the advantage that the described IC card domain can be efficiently integrated into established technologies, for example an SN100U chip from NXP.

In the context of the present application, the term "secure element domain" may refer to a domain of an electronic device that comprises a secure element. A secure element may be a specific storage unit that stores sensitive data such as user credentials which are mandatory to perform specific transactions. For example, if the secure element is built in a smart-phone, the operating system and other applications of the smart phone may not enter the data stored on the secure element. Hereby, the secure element may only be accessed by specific and authorized transactions (e.g. by an external reader device of a point of sale). The secure element in the present case may comprise two or more interfaces for different applications. In this manner, the secure element domain may also comprise two or more interfaces connected to the secure element. The secure element domain may comprise only the secure element or the secure element domain may comprise the secure element and further units. For example, the secure element may comprise a secure element operating system or the secure element domain may comprise the secure element and additionally a secure element operating system (e.g. on a further circuit/processor). The secure element domain may comprise one or more secure elements. The secure element may be an embedded secure element or a removable secure element. The secure element domain may comprise a UICC (or embedded UICC) and the secure element may be part of the (e)UICC or may be separate from the (e)UICC.

According to a further embodiment, the electronic device further comprises a contact-less communication domain, wherein the contact-less communication domain and the secure element domain are connected via a domain interface. This may also provide the advantage that the described IC card domain can be efficiently integrated into established technologies.

In the context of the present application, the term "contact-less communication domain" may refer to a domain of an electronic device (such as an integrated circuit) that is configured for performing, or taking part in, a contact-less communication transaction. Hence, the contact-less communication domain may comprise a contact-less communication processor and/or a contact-less communication controller. The term "contact-less" may mean a wireless communication such as for example via NFC, RFID, WLAN, or Bluetooth. For this purpose, a contact-less communication domain may comprise a controller circuit (or processor) in order to manage the contact-less communication (e.g. an NFC controller). Furthermore, the domain may comprise an interface to an antenna (e.g. an NFC antenna). In another example, the domain may comprise the interface and the antenna.

According to a further embodiment, the method comprises: i) after generating the first logical interface identifier, sending the first logical interface identifier to the communication domain, and/or ii) after generating the second logical interface identifier, sending the second logical interface identifier to the communication domain. According to a further embodiment, the method further comprises: iii) storing, by the communication domain, a first association of the first logical interface identifier and the first SIM profile, and/or iv) storing, by the communication domain, a second association of the second logical interface identifier and the second SIM profile. This may provide the advantage that the communication domain has always access to the newest version of the logical interface identifiers.

The communication domain may store the association information persistently and may (directly) use it when it is re-started. The communication domain and the IC Card domain may also exchange the association information on each start-up or at any time during the operation of the communication domain (see also FIG. 6 below).

According to a further embodiment, the method comprises: generating (by the IC card domain) an administrator logical interface which is independent of the first logical interface and the second logical interface. This may provide the advantage that specific actions, such as installation or enabling/disabling, can only be performed by an administrator via the administrator logical interface. In this manner, the method is more secure.

According to a further embodiment, the method comprises: i) upon deactivating (and/or deleting) of a SIM profile: dis-associating (by the IC card domain) the logical interface (identifier) from the (respective) SIM profile, ii)

denying, by the IC card domain, (for example by ignoring or responding with an error message) a further request (in particular every further request) from the communication domain with respect to a dis-association of the logical interface (identifier), and iii) using, by the IC card domain, the dis-associated logical (channel) interface for a new request to generate a new logical interface. This may provide the advantage that the association and dis-association of SIM profiles and logical interface (identifiers) can be managed in an efficient manner and without delays.

According to a further embodiment, the method comprises: exchanging, between the communication domain and the IC card domain, the first logical interface identifier and/or the second logical interface identifier (the association information). See FIG. 6 below for an exemplary embodiment of this step.

According to a further embodiment, the method comprises: resetting (by the IC card domain) at least one of the first logical interface, the second logical interface, the first SIM profile and the second SIM profile independent of the physical interface. This may be done for example by sending a command to the administrator logical interface.

According to a further embodiment, the method comprises: i) upon deactivating and/or deleting the first SIM profile, dis-associating and/or deleting (removing) the first logical interface, and/or ii) upon deactivating and/or deleting the second SIM profile, dis-associating and/or deleting (removing) the second logical interface.

The aspects defined above and further aspects of the invention are apparent from the examples of embodiment to be described hereinafter and are explained with reference to these examples of embodiment. The invention will be described in more detail hereinafter with reference to examples of embodiment but to which the invention is not limited.

BRIEF DESCRIPTION OF THE DRAWINGS

The illustrations in the drawings are schematic. In different drawings, similar or identical elements are provided with the same reference signs.

DESCRIPTION OF EMBODIMENTS

Figure 1:
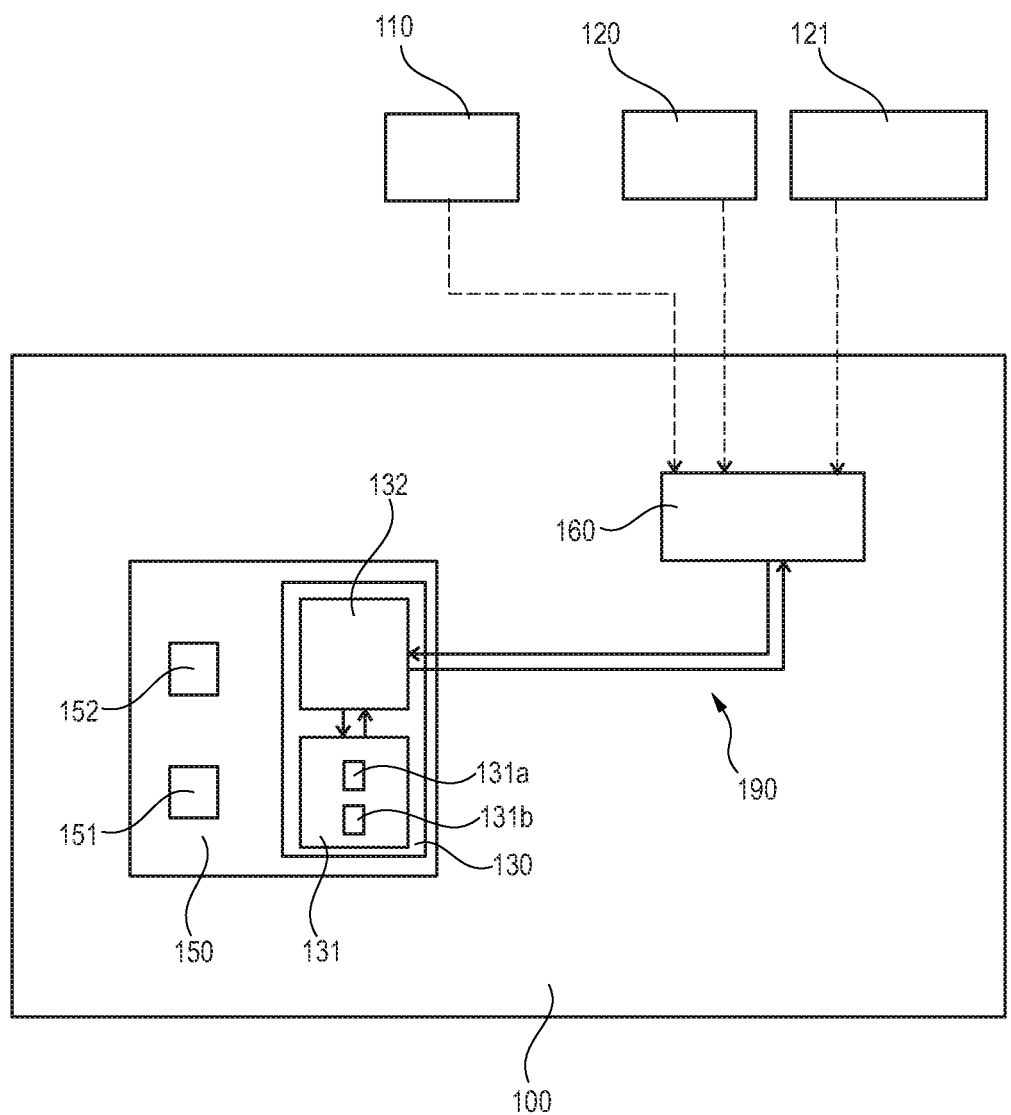
FIG. 1 illustrates an electronic device having an IC card domain and a communication domain, coupled via a physical interface, according to an exemplary embodiment.

Before, referring to the drawings, exemplary embodiments will be described in further detail, some basic considerations will be summarized based on which exemplary embodiments of the invention have been developed.

According to an exemplary embodiment, a method is proposed to install, activate and manage multiple (e)SIM profiles over a single physical interface between a modem (communication domain) and an eUICC (of an IC card domain). This is achieved by creating multiple logical interfaces on the physical interface between the modem and eUICC, associating the logical interface to a profile and use this association to address and manage an individual eSIM profile. Further, the eUICC OS implements for each logical interface an independent card OS context, allowing each profile to be active with its own context in parallel and independent of the state of any other profile.

According to an exemplary embodiment, to address the above identified requirement and issue, it is proposed a method to define multiple logical interfaces over the physical interface between a modem (of a communication domain) and an eUICC (of an IC card domain). The method may comprise: i) each logical interface has a "logical interface identifier" assigned to be used during communication over the physical interface. The identifier could be a pair of identifiers to be used for each direction of communication; ii) the card OS (operating system of the IC card domain) associates a dedicated pair of the logical interface identifier for administrative communication of the card OS which is independent of the profile; iii) the card OS creates an independent GP (global platform) context per each logical interface even though it is on the same physical interface; iv) installation of an eSIM profile is done using the administrative logical interface, the card OS assigns a logical interface and interface identifier (pair) to the profile and returns this identifier to the modem; v) the modem stores the association of the profile and its logical interface identifier returned by the eUICC card OS and uses it for further communication for the profile management functions (logical SIM slots); vi) further on every start-up/reset, the card OS publishes the currently installed profile and logical interface association information as part of the initialization (reset) response. This allows the modem to use this information for further communication with multiple active profiles; vii) alternately, this information could be queried by modem by a dedicated command; viii) given the independent logical interface to address a profile and independently maintained context for each profile, it is possible to have multiple active profiles at the same time; ix) the card OS provides a means to avoid resetting the eUICC card OS as part of enabling or disabling a profile (as per GSMA SGP22 section 3.2.1 enable profile). This is to avoid such reset action causing interference with already enabled profile's communication with modem (a logical reset linked); x) furthermore, the modem can use eUICC reset only during start-up and recovery from physical interface communication errors.

According to an exemplary embodiment, a method is proposed to define multiple logical interfaces for each enabled MNO SIM profile which can be accessed by using the pairing of a logical interface to the profile. Each logical interface is, when used, linked to its dedicated global platform context, thereby avoiding any interference between different profiles. The method also provisions for an administrator logical interface independent of the profile linked interface to execute tasks like profile installation, enable, disable and other non-profile related operations.

FIG. 1 illustrates an electronic device 100 that comprises a secure element domain 150 with a secure element 151 and a secure element OS 152. In the secure element domain 150, there is an IC domain 130 integrated. The IC card domain 130 comprises an eUICC 131 which stores a first SIM profile 131a and a second SIM profile 131b. The IC card domain 130 further comprises an eUICC OS (card OS) 132 coupled to the eUICC 131. The electronic device 100 further comprises a communication domain 160 coupled to the IC card domain 130 via exactly one single physical interface 190, wherein the physical interface 190 has two communication directions. The communication device 160 comprises hereby a baseband modem. The physical interface 190 is a contact connection, in particular an ISO 7816 contact interface connection.

The IC card domain 130 is configured to generate a first logical interface on the physical interface 190 and associate the first SIM profile 131a with the first logical interface by providing a first logical interface identifier. The IC card domain 130 is further configured to generate a second logical interface on the physical interface 190 and associate the second SIM profile 131b with the second logical interface by providing a second logical interface identifier. The communication domain 160 is configured to address the first SIM profile 131a, using the first logical interface identifier, in parallel and independent from the second SIM profile 131b and to address the second SIM profile 131b, using the second logical interface identifier, in parallel and independent from the first SIM profile 131a.

The communication device 160 can be coupled, e.g. in a wireless manner, with a mobile network of an MNO 120. In particular, the communication device 160 can be coupled with two or more mobile networks of different MNOs 120, 121 at the same time. Hereby, a first mobile network 120 of a first MNO is associated with the first SIM profile 131a, while the second mobile network 121 of the second MNO is associated with the second SIM profile 131b. The mobile networks 120, 121 can be associated with a local profile assistant (LPA) in order to establish or manage a SIM profile 131a, 131b on the IC card domain 130. In addition to the mobile networks 120, 121 of the multiple MNOs, applications on an application processor 110 of the electronic device 100 can also communicate individually with the first SIM profile 131a or the second SIM profile 131b. In the described manner, the SIM profiles 131a, 131b can be managed (through the communication device 160) at the same time and independent from each other.

Figure 2:
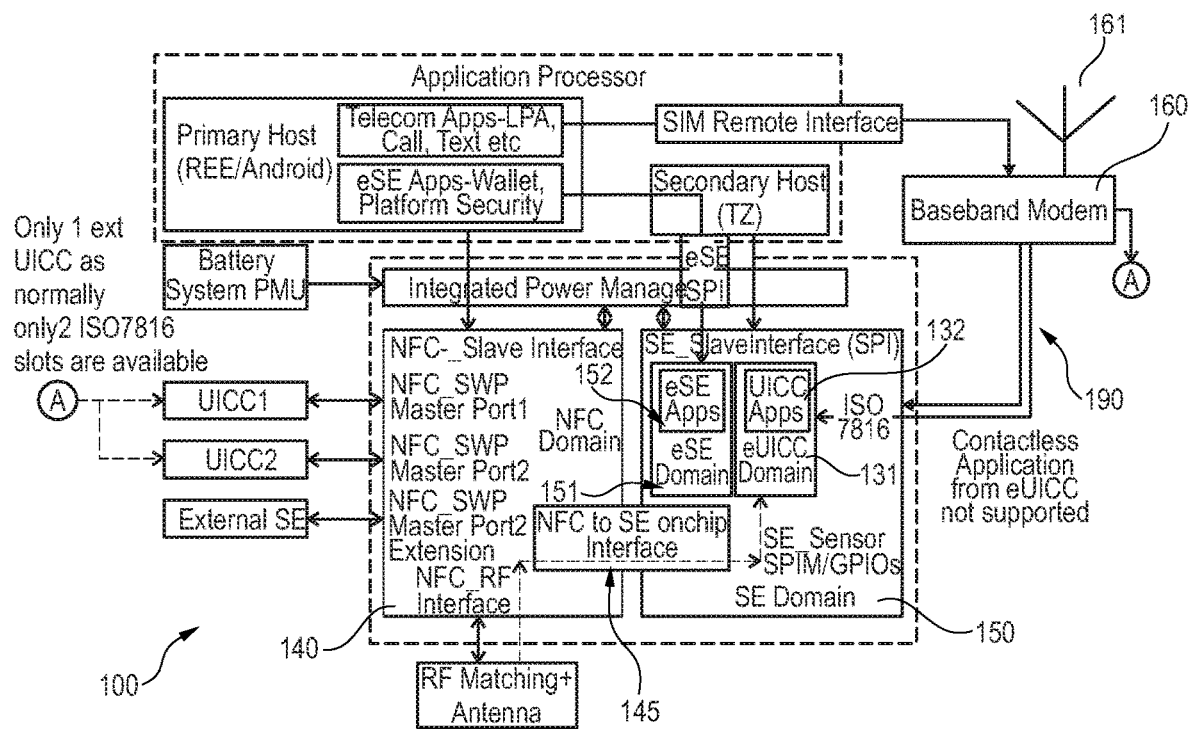
FIG. 2 illustrates an implementation of the electronic device in an NXP chip according to an exemplary embodiment.
Figure 3:
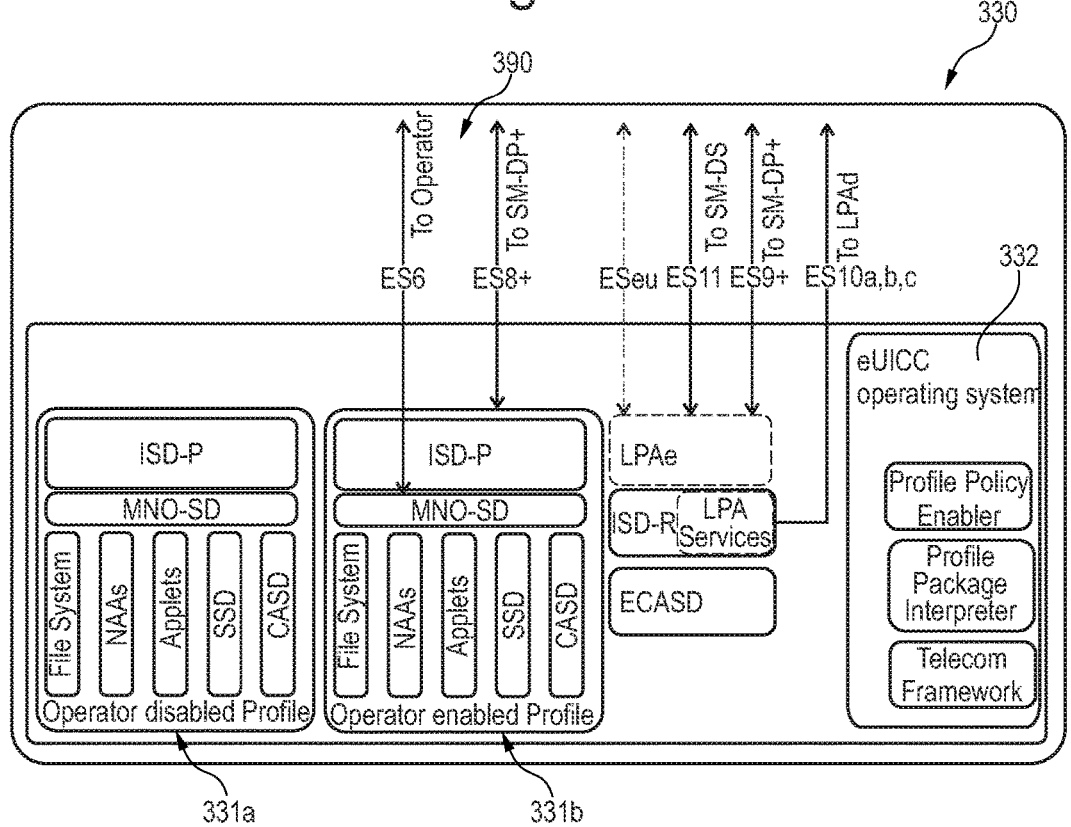
FIG. 3 illustrates an eUICC of an IC card domain according to an example from the prior art (see description above).

FIG. 2 illustrates exemplary embodiment of an implementation of the described IC card domain 130 in an SN100U chip from NXP. Said chip comprises an embedded secure element 151 in a secure element domain 150, and an NFC domain 140, which are coupled via a domain interface 145. The chip is for mobile devices (e.g. smart phones) and supports multiple interfaces (e.g. NFC to contact-less, NFC to host, SPI, ISOUART, I2C) towards different hosts like an external contact-less reader, an application processor, or a (baseband) modem 160. Hereby, the IC card domain 130 and the modem (which forms part of a communication domain 160) can be seen as the described electronic device 100, implemented using said NXP chip in a mobile phone. The IC card domain 130 and the communication domain 160 are physically connected via an ISO 7816 contact interface. The communication domain 160 comprises an antenna 161 in order to communicate in a wireless manner with the one or more mobile networks 120, 121.

Figure 4:
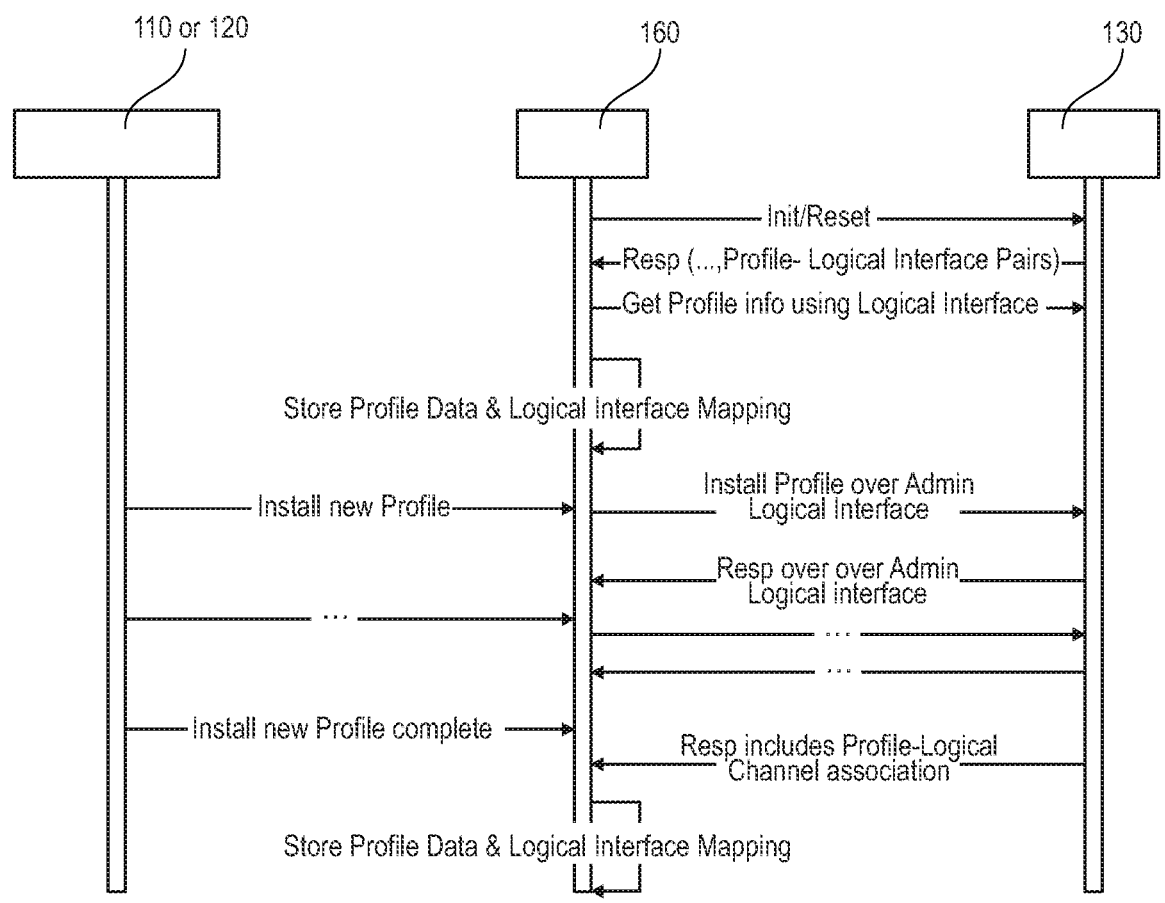
FIG. 4 illustrates a method of managing an IC card domain with multiple SIM profiles in the context of a local profile assistant (LPA) according to an exemplary embodiment.

FIG. 4 illustrates an exemplary embodiment of a method for managing an IC card domain 130 with multiple SIM profiles 131a,b that interacts, via a communication domain 160, with a local profile assistant (LPA) of a mobile network 120 of an MNO or an application processor 110. When the LPA installs a new SIM profile, said profile is sent to the communication domain 160. A specific administrator logical interface is used to install this new SIM profile, next to multiple SIM profiles, on the IC card domain 130. After completion of the installation, the IC card domain 130 generates a logical interface for the new SIM profile and associates a new logical interface identifier with the new SIM profile and its logical interface. This identifier is then sent to the communication device 160 and is stored there.

Figure 5:
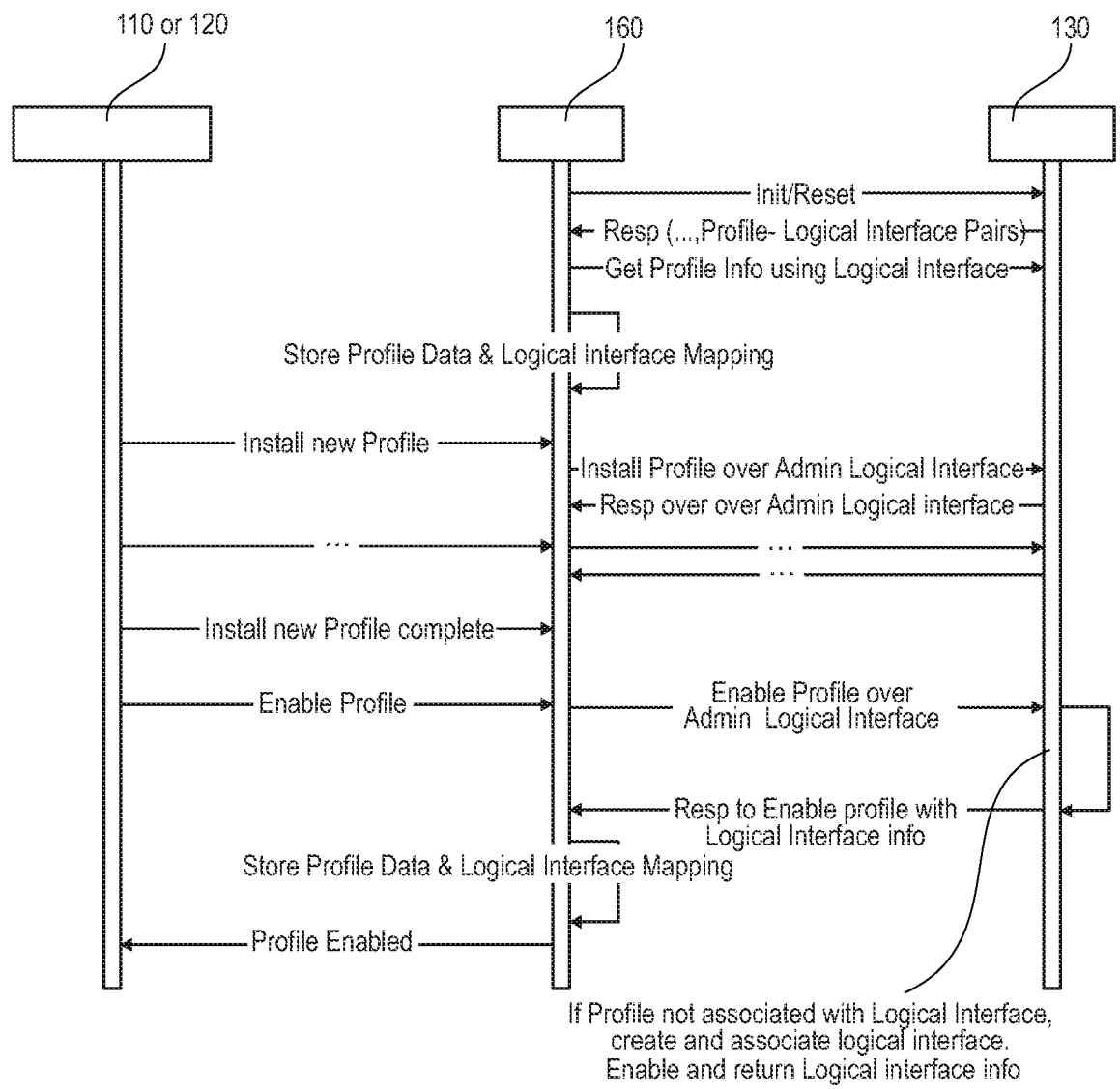
FIG. 5 illustrates a method of managing an IC card domain with multiple SIM profiles in the context of an LPA according to another exemplary embodiment.

FIG. 5 illustrates another exemplary embodiment of a method for managing an IC card domain 130 with multiple SIM profiles 131a,b that interacts, via a communication domain 160, with a local profile assistant (LPA) of a mobile network 120 of an MNO or an application processor 110. The method is similar to the method described for FIG. 4 above, with the difference that the new SIM profile is additionally enabled through the administrator logical interface. In order to enable the SIM profile successfully, the logical interface identifier has to identify correctly the new SIM profile and its logical interface or generate and associate a new logical interface. Afterwards, the new SIM profile can be addressed by the communication device 160 (or by the application processor via the communication device 160) at the same time and independent of the other SIM profiles of the IC card domain 130.

Figure 6:
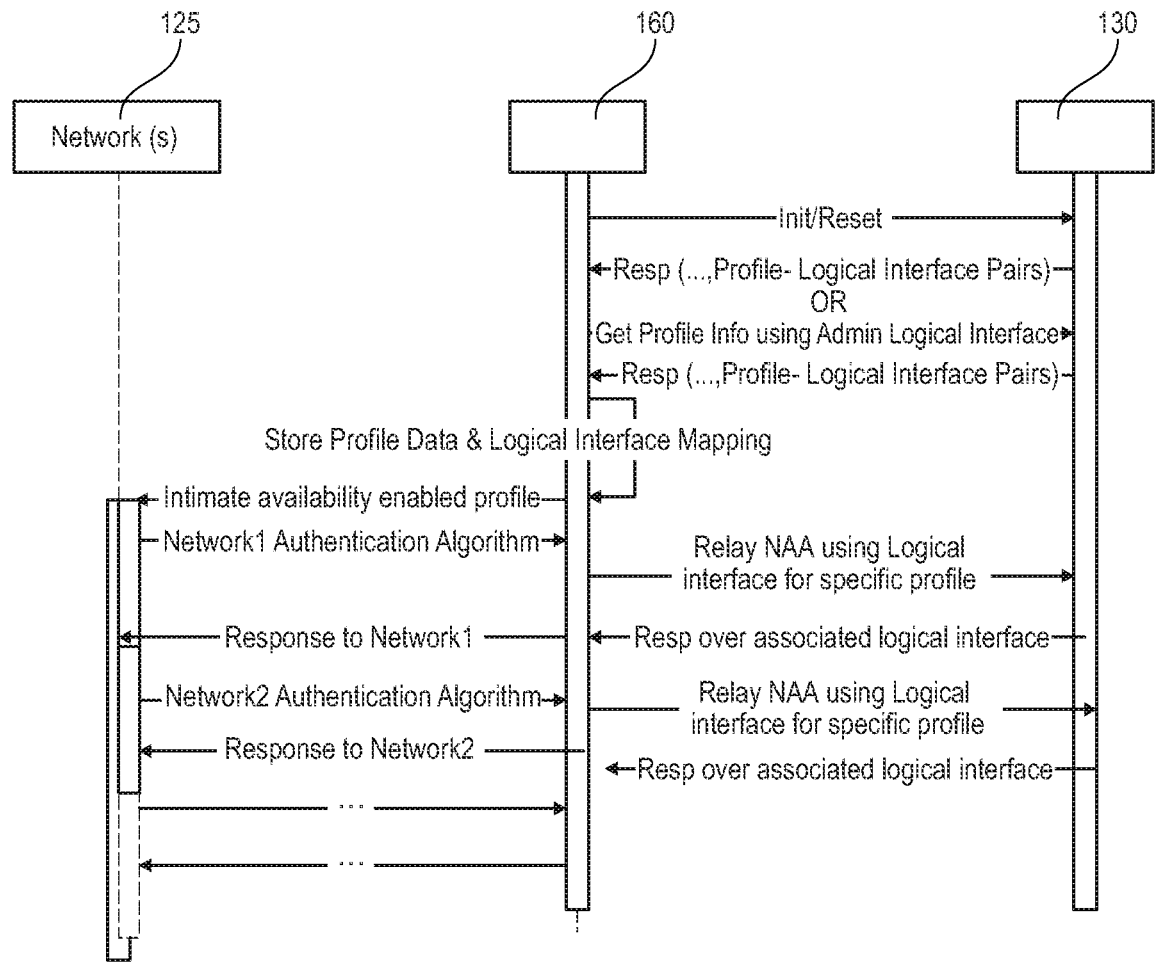
FIG. 6 illustrates a method of managing an IC card domain with multiple SIM profiles in the context of a network according to an exemplary embodiment.

FIG. 6 illustrates an exemplary embodiment of a method for managing an IC card domain 130 with multiple SIM profiles 131a,b that interacts, via a communication domain 160, with a network 125. In a similar manner as described above for the LPA, the network 125 (e.g. internet) may address (via the communication device 160) a specific SIM profile at the same time and independent of the other SIM profiles by using a specific logical interface associated with the specific SIM profile by a logical interface identifier. FIG. 6 also illustrates that the association between logical interface and SIM profile can be exchanged between the communication domain 160 and the IC card domain 130 during the start-up or during any other time after the generation and association of the logical interface. The logical interface identifier used by the IC card OS may also be mapped via an indirect reference to the SIM profile. In this manner, it is possible that the logical interface identifier used by the IC card OS internally can be different from the logical interface identifier used during the communication.

REFERENCE NUMERALS

100 Electronic device
110 Application processor
120 First mobile network of first MNO associated with the first SIM profile
121 Second mobile network of second MNO associated with the second SIM profile
125 Network
130 IC card domain
131 eUICC card
131a First SIM profile
131b Second SIM profile
132 IC card OS, UICC applications
140 NFC domain
145 Domain interface
150 Secure element domain
151 Secure element
152 Secure element OS, secure element applications
160 Communication device
161 Antenna
190 Physical interface
330 Prior art IC card domain
331a Prior art first SIM profile 331b Prior art second SIM profile
332 Prior art IC card OS
390 Prior art physical interface

The invention claimed is:

1. An electronic device comprising:
an integrated circuit (IC) card domain configured to store a first SIM profile and a second SIM profile; and
a communication domain coupled to the IC card domain via a physical interface;
wherein the IC card domain is configured to:
generate a first logical interface on the physical interface;
associate the first SIM profile with the first logical interface by providing a first logical interface identifier that includes a first pair of identifiers, each of the first pair of identifiers corresponding to a respectively different direction of communication;
generate a second logical interface on the physical interface; and
associate the second SIM profile with the second logical interface by providing a second logical interface identifier that includes a first pair of identifiers, each of the second pair of identifiers corresponding to a respectively different direction of communication; and
wherein the communication domain is configured to:
address the first SIM profile, using the first logical interface identifier, in parallel and independent from the second SIM profile;
address the second SIM profile, using the second logical interface identifier, in parallel and independent from the first SIM profile;
install a new SIM profile using an administrator logical interface next to the first and second SIM profiles on the IC card domain, the administrator logical interface is independent of the first and second logical interfaces;
generate a logical interface for the new SIM profile and associate a new logical interface identifier with the new SIM profile; and
store the new logical interface identifier, wherein the IC card domain comprises an UICC, and wherein two or more SIM profiles are stored on the UICC such that the IC card domain generates two or more respective logical interfaces.

2. The electronic device according to claim 1, wherein:
upon deactivating a SIM profile, by the IC card domain, dis-associating a logical interface identifier from the deactivated SIM profile;
denying, by the IC card domain, a further request from the communication domain with respect to a dis-association of the logic interface identifier; and
using, by the IC card domain, the dis-associated logical interface for a new request to generate a new logical interface.

3. The electronic device according to claim 1, wherein the UICC is an embedded UICC.

4. The electronic device according to claim 1, wherein the communication domain comprises a modem.

5. The electronic device according to claim 4, wherein the modem is a baseband modem.

6. The electronic device according to claim 1, wherein there is one single physical interface between the IC card domain and the communication domain.

7. The electronic device according to claim 1, wherein the physical interface is a contact connection.

8. The electronic device according to claim 1, wherein the physical interface is one of the group consisting of an ISO 7816 interface, an UART interface, an SPI interface, an I2C interface, or an I3C interface.

9. The electronic device according to claim 1, wherein at least one of the first logical interface identifier and the second logical interface identifier is configured as a direct or indirect reference.

10. The electronic device according to claim 9, wherein at least one of the first logical interface identifier and the second logical interface identifier is configured as a node address.

11. The electronic device according to claim 10, wherein at least one of the first logical interface identifier and the second logical interface identifier is configured as a node address in the ISO 7816-3 protocol.

12. The electronic device according to claim 1, wherein the electronic device comprises a secure element domain with a secure element, and
wherein the IC domain is integrated in the secure element domain.

13. The electronic device according to claim 1, wherein the IC card domain is further configured to:
generate and associate an independent context to the first logical interface; and
generate and associate an independent context to the second logical interface.

14. A method of managing an electronic device, wherein the electronic device comprises an integrated circuit, IC, card domain with a first SIM profile and a second SIM profile, and a communication domain, wherein the IC card domain and the communication domain are coupled via a physical interface, the method comprising:
generating a first logical interface on the physical interface;
associating the first SIM profile with the first logical interface by providing a first logical interface identifier that includes a first pair of identifiers, each of the first pair of identifiers corresponding to a respectively different direction of communication;
generating a second logical interface on the physical interface;
associating the second SIM profile with the second logical interface by providing a second logical interface identifier that includes a second pair of identifiers, each of the second pair of identifiers corresponding to a respectively different direction of communication;
addressing the first SIM profile, using the first logical interface identifier, by the communication domain, in parallel and independent from the second SIM profile; and
addressing the second SIM profile, using the second logical interface identifier, by the communication domain, in parallel and independent from the first SIM profile;
installing a new SIM profile using an administrator logical interface next to the first and second SIM profiles on the IC card domain;
generating a logical interface for the new SIM profile and associating a new logical interface identifier with the new SIM profile; and
storing the new logical interface identifier, wherein the first logical interface, the second logical interface, and the administrator logical interface are separate from each other, the administrator logical interface operating independently of the first and second logical interfaces.

15. The method according to claim 14, comprising at least one of:
- after generating the first logical interface identifier, sending the first logical interface identifier to the communication domain; and
- after generating the second logical interface identifier, sending the second logical interface identifier to the communication domain.

16. The method according to claim 15, comprising at least one of:
- storing, by the communication domain, a first association of the first logical interface identifier and the first SIM profile; and
- storing, by the communication domain, a second association of the second logical interface identifier and the second SIM profile.

17. A mobile phone comprising the electronic device according to claim 1, wherein
- upon deactivating a SIM profile, by the IC card domain, dis-associating a logical interface identifier from the deactivated SIM profile;
- denying, by the IC card domain, a further request from the communication domain with respect to a dis-association of the logic interface identifier; and
- using, by the IC card domain, the dis-associated logical interface for a new request to generate a new logical interface.

* * * * *